United States Patent Office

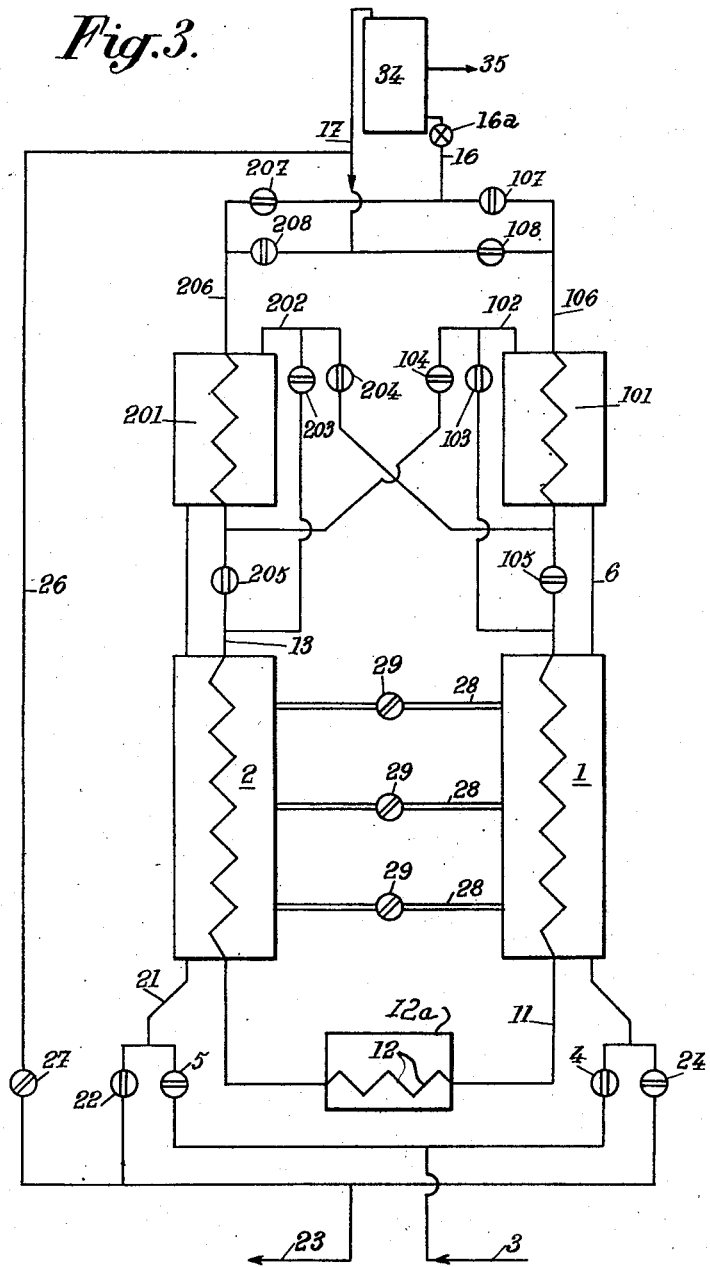

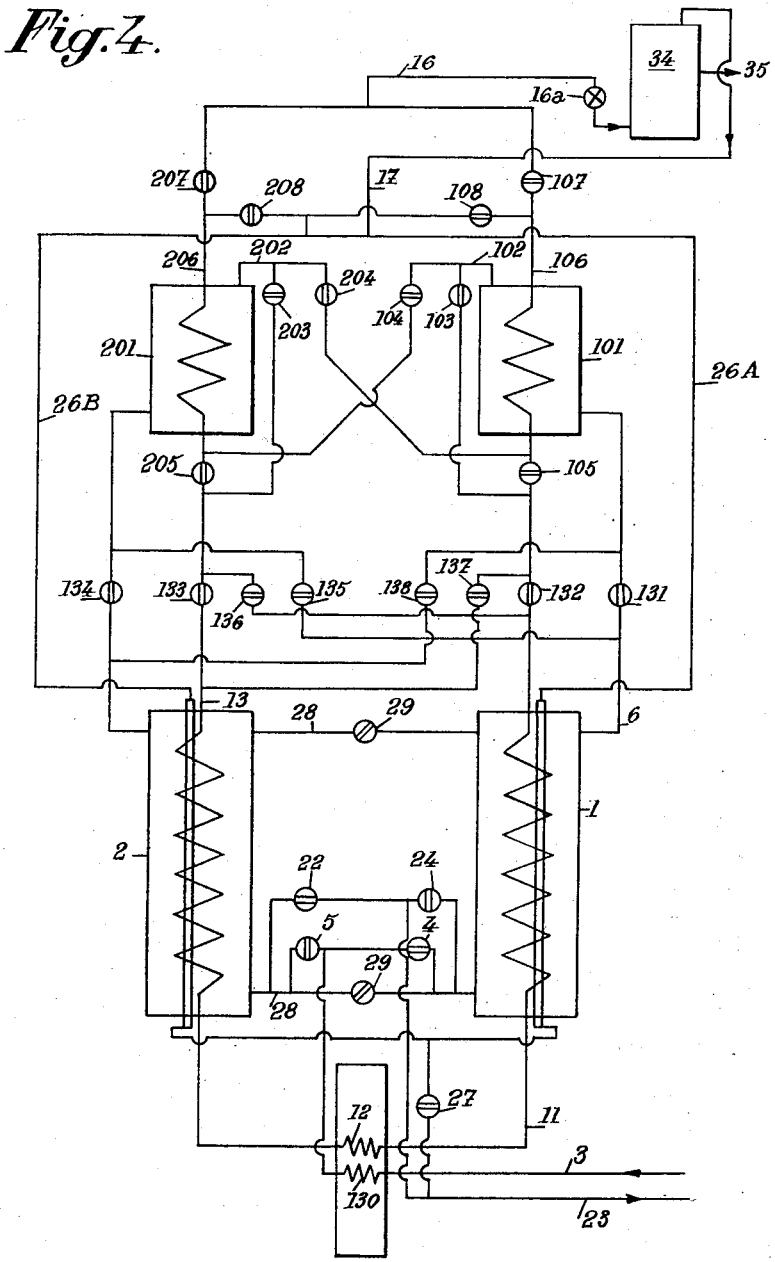

2,917,902
Patented Dec. 22, 1959

2,917,902

GAS PURIFICATION PROCESS

Rodolphe Spöndlin, Clamart, Léon Stouls, Paris, Henri Bonnaud, Viroflay, and Guy Simonet, Joinville-le-Pont, France, assignors to Commissariat a l'Energie Atomique, Paris, France, a society of the Republic of France Application August 1, 1955, Serial No. 525,712

Claims priority, application France August 6, 1954

8 Claims. (Cl. 62—13)

The present invention has for its object a method of refrigerating purification of a gas intended to be treated at low temperature, for instance in an installation for separating gases by liquefaction and rectification. This method is of the so-called periodical gaseous stream reversing type, in which the gas to be treated (for instance air to be separated) enters under pressure into a chamber of a heat exchanger where it is cooled down and deposits its impurities which are easily condensable (for instance, water and carbonic acid gas) whereas at least a portion of the treated gas (nitrogen, for instance), called "sweeping gas," passes under a lower pressure into another exchanger chamber where it heats and vaporizes the impurities deposited during a preceding period of the operation by the gas entering this last mentioned chamber. At the end of each of said periods, the gaseous streams are reversed in such manner as to cause the issuing gas to pass through the chamber where, in the preceding period, the entering gas had deposited its impurities.

There are reversing exchangers which work on this principle and comprise merely two interchangeable chambers in which the entering gas and a portion of the issuing gas pass respectively in counter-current fashion, the interchange of heat thus taking place directly between the gas that is purified and the sweeping gas.

Such an arrangement has a very serious drawback. As above stated, the sweeping gas is at a pressure substantially lower than that of the entering gas. It is known that, in these conditions, the difference of temperature between the two fluids between which the interchange of heat takes place goes increasing from the hot end toward the cold end of the exchanger, since the specific heat of a gas under pressure is higher than the specific heat of the same gas at low pressure. The impurities deposit in the vicinity of the cold end and are therefore subjected, during sweeping, to a temperature substantially lower than that at which the deposit took place. As the vapor tension of the impurities varies very much with the temperature, removal of the whole of the deposited impurities becomes generally impossible with the available flow rate of sweeping gas.

Many methods have been used for obviating this drawback but none of them has given a fully satisfactory solution of this problem.

The method according to the present invention makes it possible, on the contrary, to remove in all cases the whole of the impurities in a very thorough manner. It is characterized in that the gas to be treated is caused to pass successively through the two chambers of a first exchanger, in counter-current relation to itself, this gas being cooled down between its two passages through said two chambers by an external supply of cold, after which it passes through one of the chambers of a second exchanger identical to the first one, in counter-current relation to the sweeping gas, the supply of cold and the characteristics of the exchangers being such that the temperature of the gas to be treated at the cold end outlet of the first exchanger is lower than that of the sweeping gas at the cold end inlet of the second exchanger.

The gas to be treated thus deposits its impurities in the first chamber of the first exchanger, whereas the sweeping gas vaporizes the impurities deposited in the second exchanger during the preceding period. The first exchanger therefore works merely as a purifying element, the gas to be treated issuing therefrom, at the hot end thereof, substantially at the same temperature as it had entered it, and the second exchanger works exclusively as a heat exchanger.

It is always possible to calculate an exchanger in such manner that, with a small supply of cold, the temperature of the gas at the outlet of the first chamber of the first exchanger is lower than that of the sweeping gas at the inlet of the second exchanger. As a matter of fact, as the pressures are the same in the two chambers of the first exchanger, the heat exchange takes place with a constant temperature difference, if the heat of condensation of the impurities is negligible, whereas in the second exchanger, the temperature difference varies very much from the hot end to the cold end. This circumstance further increases, for points located between the cold end and the hot end, the difference between the temperature of the sweeping gas and that of the gas that is being purified. At every point of the exchangers, the temperature at which impurities deposit is therefore always substantially lower than that at which they are vaporized. Total removal of the impurities is therefore obtained.

In order to obtain this result even at the cold end it is generally necessary, in particular if the pressures of the gas to be treated and of the sweeping gas are not very different, to heat up the sweeping gas before it enters the second exchanger, in such manner as to create at this end a sufficient difference between the temperature at which the impurities are swept and that at which they deposit. This heating up may be obtained without loss of frigories, when the purified gas is subsequently treated in a separation installation working by liquefaction and rectification in a double column, by causing said sweeping gas, before it enters said second exchanger to circulate through a liquid cooler, i.e. an apparatus through which a liquid from said column is circulated in counter-current relation to said gas so as to yield heat to said gas. In most cases, it is also advantageous to heat up the gas to be treated as it issues from the first exchanger and before it enters the second, in such manner as to reduce to zero the temperature difference at the hot end of the first exchanger and thus to obtain, even at the hot end of the second exchanger, a sweeping temperature higher than the temperature at which the impurities are deposited.

If the supply of cold at the cold end of the first exchanger, the heating up of the gas to be treated as it leaves the first exchanger and before it enters the second one, and possibly the heating up of the sweeping gas are obtained by means of baths of substances in the liquid state, in the presence of the gaseous phase thereof and in equilibrium therewith, under constant pressures, the two exchangers then work between well determined temperature levels, which stabilizes the operation of this system.

According to a preferred embodiment of the invention, the two exchangers are tubular exchangers, for instance of the "Hampson" type and the gaseous circuits are established in such manner that the first chamber of the first exchanger, and also the chamber of the second exchanger through which passes the sweeping gas, are constituted by the space between the envelope and the outer walls of the tubes of each exchanger. The impurities thus deposit on the outside of the tubes where there is a greater space available for them. Furthermore, the sweeping gas which is at low pressure always circulates on the outside of the tubes, which is favorable from the point of view of pressure drops.

According to a modification, which makes it possible to ensure a preliminary heating up of the sweeping gas as intensive as it may be desired, the external supply of cold, intended to cool down the gas to be treated between its passages through the two chambers of the first exchanger, takes place in a first auxiliary exchanger with a counter-current of the sweeping gas, which first auxiliary exchanger also acts as a supplementary purifier in which the gas to be treated deposits the impurities which may still have remained after passage of said gas through the first chamber of the first exchanger, whereas a second auxiliary exchanger, which may be interchanged with the first one, receives in counter-current fashion, on the one hand the gas to be treated issuing from the second main exchanger and, on the other hand the sweeping gas issuing from the first auxiliary exchanger.

This arrangement enables the sweeping gas to carry along the impurities deposited in the course of a preceding period in the second auxiliary exchanger and permits a preliminary heating up of the sweeping gas in the whole of the two auxiliary exchangers.

Preferred embodiments of the application of our invention to the purification of hydrogen containing small amounts of nitrogen, in an installation for manufacturing deuterium by liquefaction and rectification of hydrogen will be hereinafter described, with reference to the appended drawings given merely by way of example and in which:

Fig. 1 diagrammatically shows the lay-out of a purification apparatus made according to a first embodiment of our invention.

Fig. 3 shows the lay-out of a purification apparatus made according to a second embodiment, in which the auxiliary exchangers are reversed at the same time as the main exchangers.

Fig. 4 shows the lay-out of a purification apparatus made according to a third embodiment of our invention.

Figure 1:
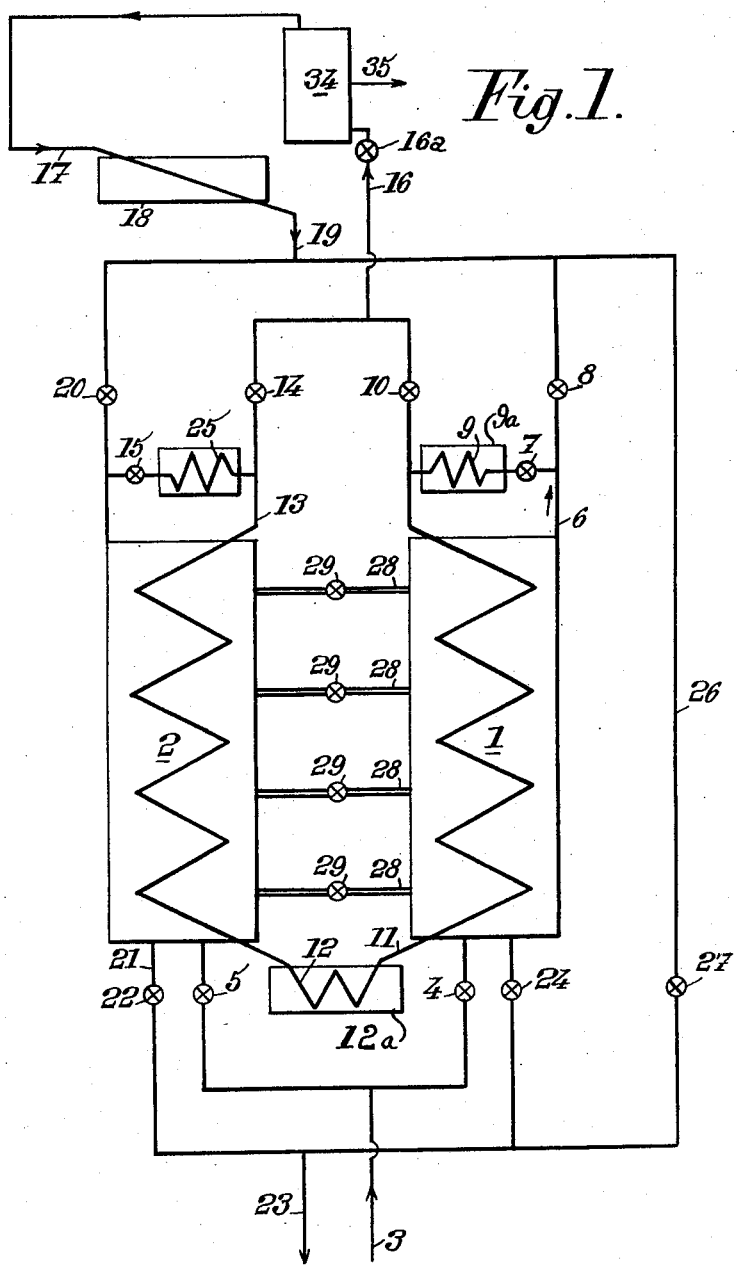

The purification apparatus of Fig. 1 belongs to an installation for producing deuterium by liquefaction and rectification of hydrogen.

The hydrogen to be treated contains small amounts of nitrogen and must be made totally free from this nitrogen before it is introduced into the separation column.

The purification apparatus includes two exchangers 1 and 2, of the "Hampson" type, the envelope of which is capable of resisting the pressure of the hydrogen to be treated. The impure hydrogen arrives under pressure through pipe 3. During a given period, valve 4 is open and valve 5 closed. The impure hydrogen therefore enters the space comprised between the casing and the outer walls of the tubes of exchanger 1 and issues through pipe 6. Valve 7 being open and valve 8 closed, the hydrogen passes through a coil 9 immersed in a bath of liquid hydrogen boiling under one atmosphere, said bath being contained in a casing $9_a$. Then, as valve 10 is closed, it again enters exchanger 1, but this time on the inside of the tubes. It issues therefrom through pipe 11 and passes through a coil 12 immersed in a bath of liquid nitrogen in the presence of its gaseous phase and in equilibrium therewith at a temperature equivalent to that of the gas to be treated entering the apparatus through pipe 3. This temperature is for instance, in a given case, 63° K.; in this case, this nitrogen is therefore kept under a pressure of 9 cms. of mercury. This last mentioned bath is contained in a casing $12_a$. This hydrogen subsequently penetrates into the tubes of exchanger 2 and issues through pipe 13. Valve 14 being open and valve 15 closed, the hydrogen under pressure passes through pipe 16 to the rectification column 34, after it has expanded (through an expansion valve 16a from its initial pressure to the pressure of said rectification column.

On the other hand, the hydrogen under low pressure (one atmosphere), separated, in the rectification column from its deuterium (evacuated out through pipe 35) flows out through pipe 17 and, before leaving the separation plant, it is heated by passing through the liquid cooling apparatus 18 where there is a counter-current flow of liquid hydrogen under three atmospheres. It issues therefrom through pipe 19 and as valves 8 and 15 are closed and valve 20 is open, enters the space of exchanger 2 between the casing thereof and the outer walls of the tubes. It issues from exchanger 2 through pipe 21, valve 22 being open and valve 5 closed, and then leaves the installation through pipe 23, valve 24 being closed.

During the next period, the valves above indicated as closed are opened and the valves that were open are closed. Coil 9 is then out of action and is replaced by an identical coil 25. Of course, with a suitable set of valves, it is possible to replace the two coils 9 and 25 by a single one.

A branch 26 and a valve 28, normally closed, make it possible to ensure the outflow of low pressure gas during the time of shifting from one period to the next one.

In order to reduce this time it is advantageous, from a thermodynamic point of view, to connect at corresponding temperature levels, the spaces of the two exchangers comprised between the envelopes and the tubes, by means of several pipes 28, for instance four of them, provided with valves 29 which are opened at the time of shifting. This arrangement makes it possible to equalize nearly instantaneously the pressures in the two chambers external to the tubes, by avoiding as much as possible any modification of the distribution of the temperatures along the two exchangers.

Figure 2:
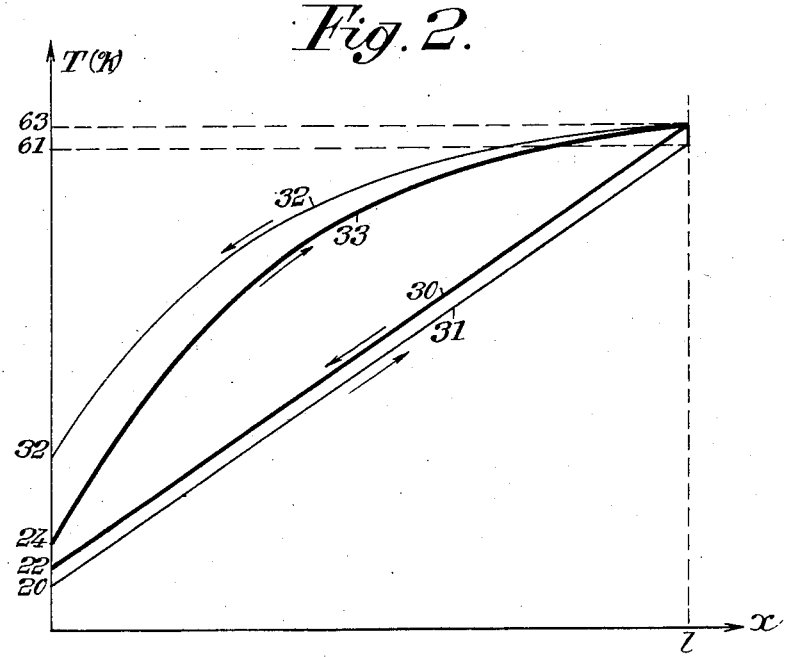
Fig. 2 is a graph showing the temperatures of the gas to be treated and of the sweeping gas, as a function of the distance from the cold end, during their passage through the two exchangers of the apparatus of Fig. 1, and in particular the temperatures of depositing of the impurities and the temperatures of vaporizing of said impurities at all points of each exchanger.

The graph of Fig. 2 shows the temperatures of the gas to be treated and of the sweeping gas, as a function of the distance from the cold end, during their passage through the two exchangers. The distances x from the cold end are plotted in abscissas and the temperatures T in Kelvin degrees are plotted in ordinates. The total length of each exchanger is indicated by $l$.

The gas to be treated enters exchanger 1 (or 2) at a temperature of 63° K. It cools therein down to 22° K. along curve 30 which is substantially a straight line. It is subsequently cooled down to 20° K. in coil 9 (or 25). Then it is heated inside the tubes of the same exchanger up to 61° K., along curve 31 parallel to curve 30. It is further heated in coil 12 up to 63° K., which temperature is that at which it had entered the exchanger.

Then, the gas to be treated enters the tubes of exchanger 2 (or 1) where it is cooled down to about 32° K., along curve 32 the concavity of which is turned downwardly. Finally it passes into the separation column.

On the other hand, the sweeping gas issuing from liquid cooler 18 enters exchanger 2 (or 1), at a temperature of 24° K. The temperature difference at the hot end of this exchanger is generally negligible. The sweeping gas is therefore reheated practically up to 63° K. along curve 33 the concavity of which is necessarily turned downwardly as that of curve 32. Then it passes to the outside of the apparatus.

The depositing of sublimated impurities, in particular nitrogen, takes place during the cooling of the gas to be treated along curve 30, that is to say in the space existing between the envelope and the outer walls of the tubes of exchanger 1 (or 2), whereas vaporizing of the impurities that have been deposited takes place during the heating up of the sweeping gas along curve 33, which means that these impurities are carried along to the outside of the space comprised between the casing and the outer walls of the tubes of exchanger 2 (or 1). Due to the respective positions of the extreme points of these two curves and of the concavity of curve 33, this last mentioned curve is constantly above curve 30. Consequently, the vaporizing temperatures are constantly above the depositing temperatures.

The purification apparatus of Fig. 3 includes two main exchangers 1 and 2 and two auxiliary exchangers 101 and 201, of the "Hampson" type for instance, the envelope of which is capable of resisting to the pressure of the hydrogen to be treated.

The impure hydrogen arrives under pressure (for instance 30 atm.) through pipe 3. During a given period, valve 4 is open and valves 5 and 24 closed. The impure hydrogen therefore enters the space between the envelope and the tubes of the main exchanger 1 and issues through pipe 6.

The hydrogen then enters the space comprised between the envelope and the outer walls of the tubes of the auxiliary exchanger 101 and issues through pipe 102. As valve 103 is open and valves 104 and 105 closed, the hydrogen again enters the main exchanger 1, but this time on the inside of the tubes. It is then much colder than when it flowed through pipe 6. It issues through pipe 11 and passes through a coil 12 immersed in a bath of liquid nitrogen in the presence of its gaseous phase and in equilibrium therewith, at 63° K. It subsequently penetrates into the tubes of the main exchanger 2 and issues through pipe 13. Then it penetrates into the tubes of the auxiliary exchanger 201, valve 205 being open and valves 203 and 104 closed. It issues therefrom through pipe 206. As valve 207 is open and valves 208 and 107 closed the hydrogen under pressure passes, through pipe 16, into the rectification column 34, after its pressure has been reduced to that of said column, by its passage through expansion valve 16a.

On the other hand, the hydrogen under low pressure (about one atmosphere), separated from its deuterium in the rectification column, arrives through pipe 17, and, as valve 208 is closed and valve 108 open, it enters through pipe 106 the tubes of the auxiliary exchanger 101. As valve 204 is open and valves 105 and 203 closed, this gas then flows through the spaces of auxiliary exchanger 201 and main exchanger 2, between the casings and the outer walls of the tubes of these exchangers. It flows out from exchanger 2 through pipe 21 and as valve 22 is open and valves 5 and 24 closed, it leaves the installation through pipe 23.

During the next period, the valves indicated above as closed are opened and the valves indicated as open are closed. Thus, the main exchangers 1 and 2 and the auxiliary exchangers 101 and 201 are simultaneously interchanged.

Branch circuit 26, valve 27, pipes 28 and valves 29 are identical to those of Fig. 1 and their operation is the same.

In the construction of Fig. 4, the period of interchanging the auxiliary exchangers is different from that of interchanging the main exchangers. In this example, the elements which are analogous to those of Fig. 3 are designated by the same reference numerals as in the first example and are not described in detail.

The apparatus of Fig. 4 additionally comprises, according to the present invention, a coil 130 which is immersed in the same bath of liquid nitrogen as coil 12 and through which passes the hydrogen under pressure before flowing past valve 4 and entering the main exchanger 1. Thus the gas streams under pressure entering the two main exchangers 1 and 2 are exactly at the same temperature. On the other hand, instead of a single branch pipe 26, there are two branch pipes 26A and 26B each of which flows through the core of one of the main exchangers, respectively 1 and 2, thus permitting a partial recovery of the cold of the low pressure hydrogen during every shifting time.

In order to permit of interchanging the auxiliary exchangers at a time different from that at which the main exchangers are interchanged, the apparatus of Fig. 4 includes a set of eight supplementary valves 131, 132, 133, 134, 135, 136, 137 and 138. If valves 131, 132, 133 and 134 are open and valves 135, 136, 137 and 138 are closed, and if the other valves are in the position above described with reference to the example of Fig. 3, the circulation of high pressure hydrogen and of low pressure hydrogen takes place as above described with reference to this example.

Intershifting of the main exchangers 1 and 2 takes place by acting simultaneously upon the valves of the main exchangers and upon the supplementary valves. Therefore valves 4 and 22, same as valves 131, 132, 133 and 134 are closed and valves 5 and 24, same as valves 135, 136, 137 and 138 are opened. This operation is effected for instance at intervals of five minutes.

The periods of reversing the position of the auxiliary exchangers 101 and 201 may on the contrary be much longer, i.e. average several hours. The operation is effected by operating simultaneously the valves of the auxiliary exchangers and the supplementary valves. Starting from the position initially described, valves 103, 205, 207, 108 and 204 are closed, same as valves 131, 132, 133 and 134 and valves 104, 105, 203, 208 and 107 are opened same as valves 135, 136, 137 and 138.

Figure 5:
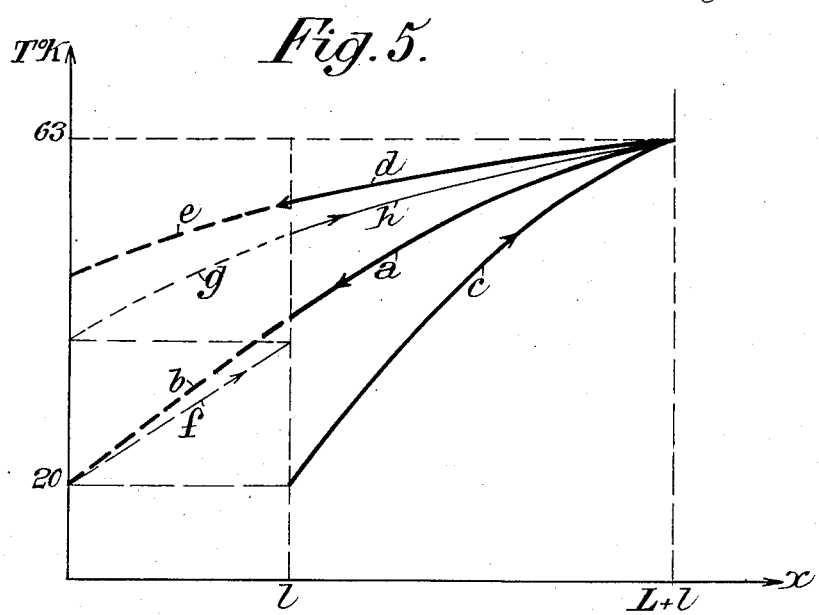
Fig. 5 is a graph showing approximately the temperatures of the gas to be treated and of the sweeping gas, in the apparatus of Figs. 4 and 5, as a function of the distance from the cold end of the auxiliary exchangers, during passage through the two main exchangers and the auxiliary exchangers.

The graph of Fig. 5 approximately shows the temperatures of the gas to be treated and of the sweeping gas, as a function of the distance from the cold end of the auxiliary exchangers 101 and 201, during their passage through the two main exchangers and the two auxiliary exchangers. The distances $x$ from the cold end are plotted in abscissas and the temperatures T in Kelvin degrees are plotted in ordinates. The length of every auxiliary exchanger is indicated by $l$ and that of every main exchanger by L. The curves of Fig. 5 correspond to the case of a very high percentage of impurities in the gas, the heats of condensation of the impurities being comparable to the exchanged heats, (Fig. 2 corresponded to the case of a low amount of impurities).

The portions of the curves corresponding to passages through the main exchangers are traced in solid lines, whereas those corresponding to the passages through the auxiliary exchangers are traced in dotted lines.

The gas to be treated enters the main exchanger 1 (or 2) at a temperature of 63° K., then passes through the auxiliary exchanger 101 (or 201). Cooling of hydrogen takes place, in counter-current fashion with respect to itself, along the curve $a$ in the main exchanger, and the supply of cold is effected, along curve $b$, in the auxiliary exchanger. The impurities deposit mostly in the main exchanger 1 (or 2); passage through the auxiliary exchanger 101 (or 201) produces a complementary purification of the impurities which would still remain after passage through the main exchanger. The gas is then heated inside the tubes of the main exchanger, along curve $c$. It may then be heated in coil 12 up to 63° K., which is the temperature it had when entering the main exchanger.

Then the gas to be treated enters the tubes of the main exchanger 2 (or 1) and the auxiliary exchanger 201 (or 101) where it cools down along curves $d$ and $e$. It finally passes to the separation column after expansion through valve 16a.

On the other hand, the sweeping gas flows through the auxiliary exchanger 101 (or 201) on the inside of the tubes, where it is heated along curve $f$ and through the auxiliary exchanger 201 (or 101) where it is heated up along curve $g$. During the first portion of this heating up, along curve $f$, the low pressure hydrogen passes through the tubes of one of the auxiliary exchangers 101 (or 201) where it does not meet with any deposit. On the contrary, during the second portion of this heating up, along curve $g$, it enters into contact with the small amounts of impurities deposited on the outside of the tubes of the second auxiliary exchanger 201 (or 101) but it is then sufficiently hot to be able to vaporize them easily.

The sweeping gas thus heated up then passes through the main exchanger 2 (or 1) where it volatilizes the deposited impurities. It further heats up along curve $h$. Then, it flows out to the outside of the apparatus.

The depositing of impurities, in particular of nitrogen, takes place during the cooling down of the gas to be treated along curves $a$ and $b$, whereas vaporizing of the impurities that have been deposited takes place during the heating up of the sweeping gas along curves $g$ and $h$. Due to the preliminary heating up of the sweeping gas along curve $f$ and to the general shape of the various curves, curve $g$—$h$ is always above curve $a$—$b$. Consequently, the vaporizing temperatures are always above the depositing temperatures.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. The method which comprises feeding a gas mixture under pressure to one chamber of a heat exchanger and causing said gas mixture to flow through said chamber, cooling down, by means of an external supply of cold, said gas mixture flowing out from said chamber, passing the whole of the gas mixture thus cooled down through the other chamber of said heat exchanger in counter-current relation to the gaseous stream flowing through said first mentioned chamber, whereby all the impurities of said gas mixture are solidified and deposited in said first mentioned chamber as said gas mixture is flowing therethrough, passing the whole of the gas mixture flowing out from said second mentioned chamber of said heat exchanger through one chamber of a second heat exchanger identical to the first one while leaving said gas mixture substantially at its initial pressure, separating and extracting at least one desired component from the gas mixture flowing out from said chamber of said second mentioned heat exchanger, passing at least a portion, called sweeping gas, of the remainder of said gas mixture, at a lower pressure, through the other chamber of said second heat exchanger in counter-current relation to the gaseous stream flowing through the first mentioned chamber of said second mentioned exchanger so as to cool down said last mentioned gaseous stream, said external supply of cold and the characteristics of said heat exchangers being chosen so that the temperature of the gas mixture flowing out from the first mentioned chamber of the first heat exchanger is lower than that of the sweeping gas entering the second mentioned chamber of the second mentioned heat exchanger, and periodically reversing the directions of flow through said two heat exchangers, whereby the impurities deposited during one period in one of the chambers of one of said heat exchangers are, during the next period, heated, vaporized and carried along by the sweeping gas then flowing through said chamber.

2. A method according to claim 1 which further comprises heating up said sweeping gas before feeding it to said second mentioned chamber of said second mentioned heat exchanger.

3. A method according to claim 1 which comprises separating said desired component in a liquefaction and rectification plant including a liquid cooler, this method further comprising the step of heating up said sweeping gas before feeding it to the second mentioned chamber of said second mentioned heat exchanger by passing said sweeping gas through said cooler in counter-current to the flow of liquid to be cooled in said cooler.

4. A method according to claim 1 which further comprises heating up said gas mixture as it leaves said second mentioned chamber of said first mentioned heat exchanger and before it enters said first mentioned chamber of said second mentioned heat exchanger so as to give it back the same temperature as it had when entering said first heat exchanger.

5. A method according to claim 4 in which said external supply of cold, said heating up of said gas mixture between its passage through said two heat exchangers and said heating up of said sweeping gas are achieved by means of baths of liquids in the presence of their gaseous phases under constant pressures and in equilibrium therewith.

6. A method according to claim 1 in which said cooling down of said gas mixture flowing out from said first mentioned chamber of said first mentioned heat exchanger is carried out by passing said gas mixture through one of the chambers of an auxiliary heat exchanger and circulating through the other chamber of said auxiliary heat exchanger said sweeping gas as remaining after separation and extraction of said desired component from said gas mixture, whereby further impurities deposit in said auxiliary heat exchanger, the method further including passing the sweeping gas flowing out from said auxiliary heat exchanger through one chamber of a second auxiliary heat exchanger, and thence to said second mentioned chamber of said second mentioned main heat exchanger and passing through the other chamber of said second mentioned auxiliary heat exchanger the gas mixture flowing out from the first mentioned chamber of said second mentioned main heat exchanger, and periodically reversing the directions of flow through said two auxiliary heat exchangers.

7. A method according to claim 6 in which the periodical reversings of the directions of flow through said two auxiliary heat exchangers are effected simultaneously with the reversings of the directions of flow through said two main heat exchangers.

8. A method according to claim 6 in which the periodical reversings of the directions of flow through said two auxiliary heat exchangers are effected at time intervals longer than those at which the reversings of the directions of flow through said two main heat exchangers are effected.

References Cited in the file of this patent

UNITED STATES PATENTS

| 2,116,191 | De Baufre | May 3, 1938 |
| 2,496,380 | Crawford | Feb. 7, 1950 |
| 2,534,478 | Roberts | Dec. 19, 1950 |
| 2,552,558 | Jenny | May 15, 1951 |
| 2,579,498 | Jenny | Dec. 25, 1951 |
| 2,590,145 | Aronson | Mar. 25, 1952 |
| 2,622,416 | Ogorzaly | Dec. 23, 1952 |
| 2,660,038 | Pool | Nov. 24, 1953 |